(12) United States Patent
Sugimoto et al.

(10) Patent No.: US 6,275,772 B1
(45) Date of Patent: Aug. 14, 2001

(54) VEHICLE SAFETY RUNNING SYSTEM

(75) Inventors: Yoichi Sugimoto; Satoshi Hada; Yoshihiro Urai; Shoji Ichikawa; Shohei Matsuda, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,797

(22) Filed: Oct. 18, 1999

(30) Foreign Application Priority Data

Nov. 4, 1998 (JP) .................................................. 10-313003

(51) Int. Cl.$^7$ ................................ B62D 1/00; B62D 5/00; B62D 6/00; G06F 7/00; G06F 17/00; G06F 19/00

(52) U.S. Cl. .......................... 701/301; 701/300; 701/1; 180/169; 180/197; 340/435; 340/436; 340/903; 340/904; 340/933; 342/62; 342/70; 342/71; 342/174; 280/735

(58) Field of Search .................................. 701/300, 301, 701/1; 180/169, 197; 340/435, 436, 903, 904, 933; 342/70, 71, 174, 62; 364/565, 424.05, 424.01; 280/735; 318/489, 457

(56) References Cited

U.S. PATENT DOCUMENTS

| | | | |
|---|---|---|---|
| 4,641,136 | * | 2/1987 | Kowalczyk ........................... 340/903 |
| 5,166,681 | * | 11/1992 | Bottesch et al. ...................... 340/933 |
| 5,495,254 | * | 2/1996 | Uemura et al. ....................... 342/174 |
| 5,529,138 | * | 6/1996 | Shaw et al. ........................... 180/169 |
| 5,646,612 | * | 7/1997 | Byon .................................... 340/903 |
| 5,699,040 | * | 12/1997 | Matsuda ............................... 340/435 |
| 5,808,561 | * | 9/1998 | Kinoshita et al. .................... 340/903 |
| 5,986,601 | * | 11/1999 | Sugimoto .............................. 342/70 |
| 6,157,294 | * | 12/2000 | Urai et al. ............................. 340/436 |

* cited by examiner

Primary Examiner—William A. Cuchlinski, Jr.
Assistant Examiner—Ronnie Mancho
(74) Attorney, Agent, or Firm—Arent Fox Kintner Plotkin & Kahn, PLLC

(57) ABSTRACT

In a vehicle safety running system, while a contact probability estimation section estimates that there is a probability that a subject vehicle comes into contact with an object and an automatic braking section performs automatic braking, when the driver voluntarily performs a steering operation to avoid the contact, an automatic braking cancellation gradient is calculated based on the contact probability detected with the contact probability estimation section and the steering operation amount detected with the steering operation amount detection section, whereby automatic braking is cancelled at a speed corresponding to the automatic braking cancellation gradient so calculated. When the contact is easily avoided through the steering operation, the automatic braking cancellation gradient is set large so as to cancel automatic braking quickly, while when the contact is difficult to be avoided, the automatic braking cancellation gradient is set small so as to cancel automatic braking moderately.

7 Claims, 7 Drawing Sheets

VEHICLE SAFETY RUNNING SYSTEM

BACKGROUND OF THE INVENTION

1. Field of the Invention

The present invention relates to a vehicle safety running system in which an object is detected with an object detection means such as a laser radar, and in which when it is judged that there is a probability of a subject vehicle's coming into contact with the object so detected, a braking system of the subject vehicle is automatically actuated in order to avoid such a contact.

2. Description of the Related Art

A vehicle safety running system is already known wherein the relative distance and relative speed of an object such as a preceding vehicle running in the same lane as that where a subject vehicle runs are detected with an object detection means such as a laser radar, millimeter wave radar and CCD camera, and wherein if there is estimated a probability of the subject vehicle's coming into contact with the object so detected, an alarm means is actuated to try to force the driver to take a voluntary contact avoidance operation with an automatic braking device being actuated so as to avoid the probable contact of the subject vehicle with the object, or even if there is occurring a contact therebetween, the alarm means and the automatic braking device so actuated cooperate to reduce a damage to a minimum level.

Incidentally, when the driver voluntarily performs an steering operation while automatic braking is in operation so as to avoid a probable contact, such a steering operation would result in a problem of interference with the automatic braking in operation, thereby making it difficult to effectively avoid the contact or making the driver experience a feeling of physical disorder. For instance, in a case where a probable contact can be avoided by a steering operation by the driver, if automatic braking is allowed to continue to be in operation, the driver will be forced to experience a strong feeling of physical disorder. On the contrary, if the automatic braking is cancelled in a state in which a probable contact cannot be avoided by a steering operation by the driver and therefore there is no other way but to rely on the automatic braking, the automatic braking is thus not permitted to fully exhibit its effectiveness.

SUMMARY OF THE INVENTION

The present invention has been made in view of these circumstances, and it is an object of the present invention to obtain a maximum effectiveness in avoiding a contact with an object by harmonizing automatic braking for avoiding a contact with the object with a voluntary steering operation by the driver.

In order to attain the above object, according to the present invention, there is provided a vehicle safety running system comprising: object detection means for detecting an object in front of a subject vehicle in a direction in which the subject vehicle travels; contact probability estimation means for estimating probability in which the subject vehicle comes into contact with the detected object; automatic braking means for automatically actuating a brake system of the subject vehicle when the contact probability estimation means estimates that there is a probability of such contact; and steering operation amount detection means for detecting a steering operation amount based on a steering operation by a driver, wherein when the steering operation amount detection means detects that the driver performs the steering operation while the automatic braking means is in operation, the automatic braking means cancels automatic braking for a time period or at a speed determined based on at least one of the contact probability estimated by the contact probability estimation means and the steering operation amount detected by the steering operation amount detection means.

According to the above construction, while the automatic braking means performs automatic braking in order to avoid a probable contact of the subject vehicle with the object that is estimated by the contact probability estimation means, when the driver voluntarily performs the steering operation in order to try to avoid the estimated contact, since the automatic braking means cancels automatic braking for a time period or at a speed determined based on at least either of the contact probability estimated by the contact probability estimation means and the amount of the steering operation detected by the steering operation amount detection means, it is possible to avoid the interference of the steering operation by the driver with the automatic braking, while securing a maximum effectiveness of the automatic braking in avoiding the contact by canceling the automatic braking quickly or moderately depending on states.

DETAILED DESCRIPTION OF THE PREFERRED EMBODIMENT

A mode of operation of the present invention will be described below, referring to an embodiment thereof shown in the accompanying drawings.

Figure 1:
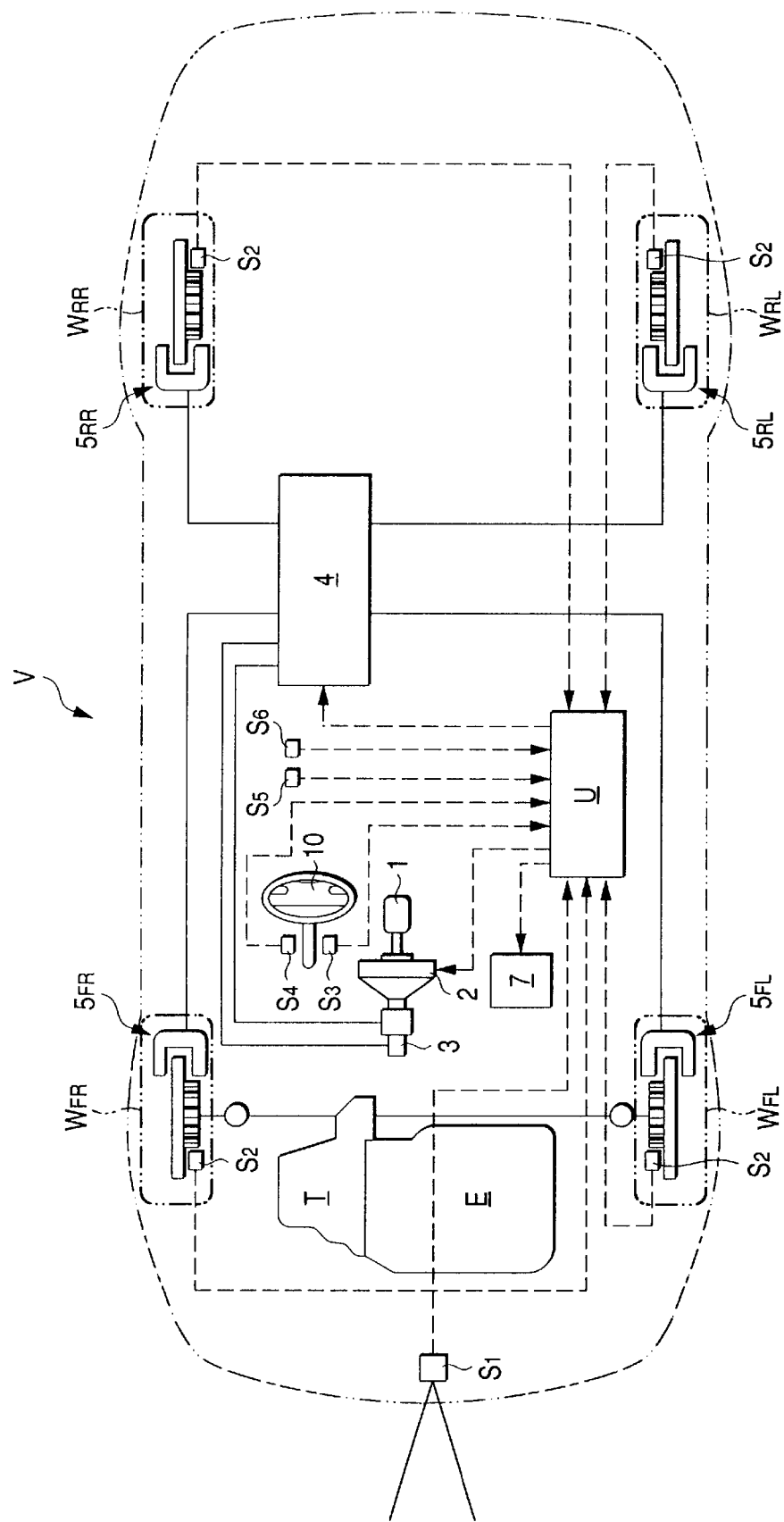
FIG. 1 is a diagram showing an overall construction of a vehicle incorporating therein a safety running system.
Figure 2:
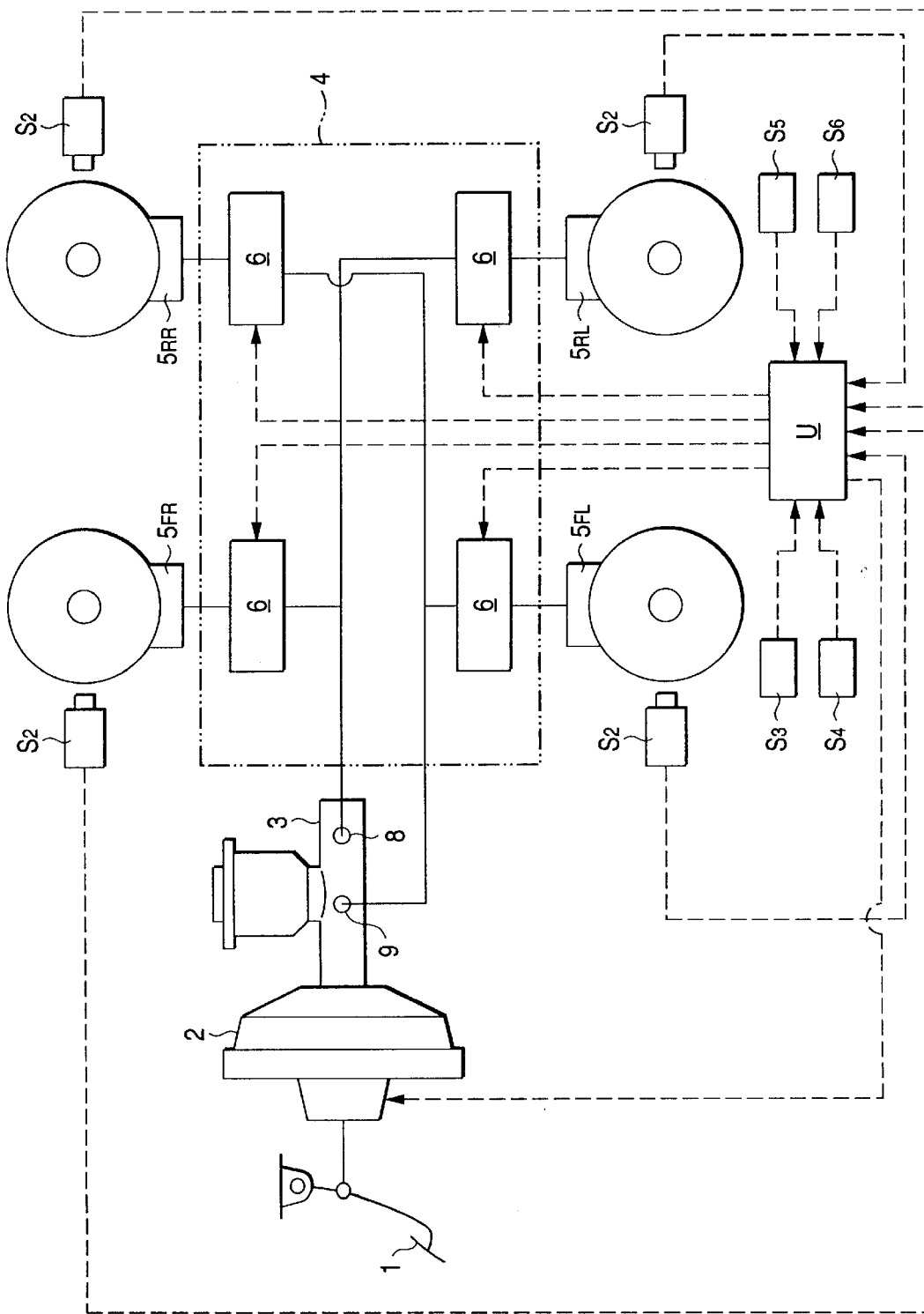
FIG. 2 is a block diagram showing a braking system.

As shown in FIGS. 1 and 2, a four-wheel vehicle V incorporating therein a safety running system of the present invention comprises right and left front wheels $W_{FR}$ and $W_{FL}$, which are driving wheels to which driving force of an engine E is transmitted via a transmission T, and right and left rear wheels $W_{RR}$ and $W_{RL}$, which are driven wheels which rotate as the vehicle V runs. A brake pedal 1, which is manipulated by the driver, is connected to a master cylinder 3 via an electronically controlled negative pressure booster 2 constituting a part of a brake system according to the present invention. The electronically controlled negative pressure booster 2 mechanically multiplies a pedal effort applied to the brake pedal 1 so as to actuate the master cylinder 3, and when automatic braking is put into operation, the booster actuates the master cylinder 3 not via manipulation of the brake pedal 1 but via a braking command signal from an electronic control unit U. In a case where a pedal effort is applied to the brake pedal 1 while a braking command signal from the electronic control unit U is inputted to the booster 2, the booster 2 outputs a brake hydraulic pressure in response to a larger one of those two inputs. An input rod of the booster 2 is connected to the brake pedal 1 via a lost motion mechanism, so that the brake pedal 1 remains at an initial position even when the booster 2 is actuated by a signal from the electronic control unit U with the input rod being moved forward.

A pair of output ports 8 and 9 of the master cylinder 3 are connected to brake calipers $5_{FR}$, $5_{FL}$, $5_{RR}$, $5_{RL}$ provided, respectively, on the front wheels $W_{FR}$, $W_{FL}$ and rear wheels $W_{RR}$, $W_{RL}$ via a hydraulic pressure control device 4, which constitutes a part of the brake system according to the present invention. The hydraulic pressure control device 4 comprises four pressure regulators 6 . . . corresponding to the four brake calipers $5_{FR}$, $5_{FL}$, $5_{RR}$, $5_{RL}$, respectively. The respective pressure regulators 6 . . . are connected to the electronic control unit U for controlling individually operations of the brake calipers $5_{FR}$, $5_{FL}$, $5_{RR}$, $5_{RL}$ provided on the front wheels $W_{FR}$, $W_{FL}$ and rear wheels $W_{RR}$, $W_{RL}$. Consequently, if brake hydraulic pressure transmitted to the respective brake calipers $5_{FR}$, $5_{FL}$, $5_{RR}$, $5_{RL}$ by the respective pressure regulators 6 . . . is controlled independently, anti-locking brake control can be effected for suppressing locking of the wheels at the time of braking the vehicle.

Connected to the electronic control unit U are a radar device $S_1$ for emanating electromagnetic waves such as laser and millimeter waves toward in front of a vehicle body of a subject vehicle and detecting a relative distance and a relative speed between an object such as a preceding vehicle and the subject vehicle based on reflected waves as a result of reflection of the electromagnetic waves off the object, wheel speed sensors $S_2$ . . . for detecting the number of rotations of the front wheels $W_{FR}$, $W_{FL}$ and rear wheels $W_{RR}$, $W_{RL}$, respectively, a steering angle sensor $S_3$ for detecting a steering angle of a steering wheel 10, a steering torque sensor $S_4$ for detecting a steering torque inputted in the steering wheel 10, a yaw rate sensor $S_5$ for detecting a yaw rate of the vehicle V, and a lateral acceleration sensor $S_6$ for detecting a lateral acceleration of the vehicle V.

Instead of the radar device $S_1$, any means such as an image sensor can be adopted for detecting a relative position of the object via twin viewing eyes.

The electronic control unit U controls the electronically controlled negative pressure booster 2 and the hydraulic pressure control device 4 based on signals from the radar device $S_1$ constituting an object detection means according to the present invention and signals from the respective sensors $S_2$ to $S_6$, and the control unit U also controls actuation of an alarm system 7 comprising a buzzer, a speaker, a chime, a lamp, a head-up display and the like.

Figure 3:
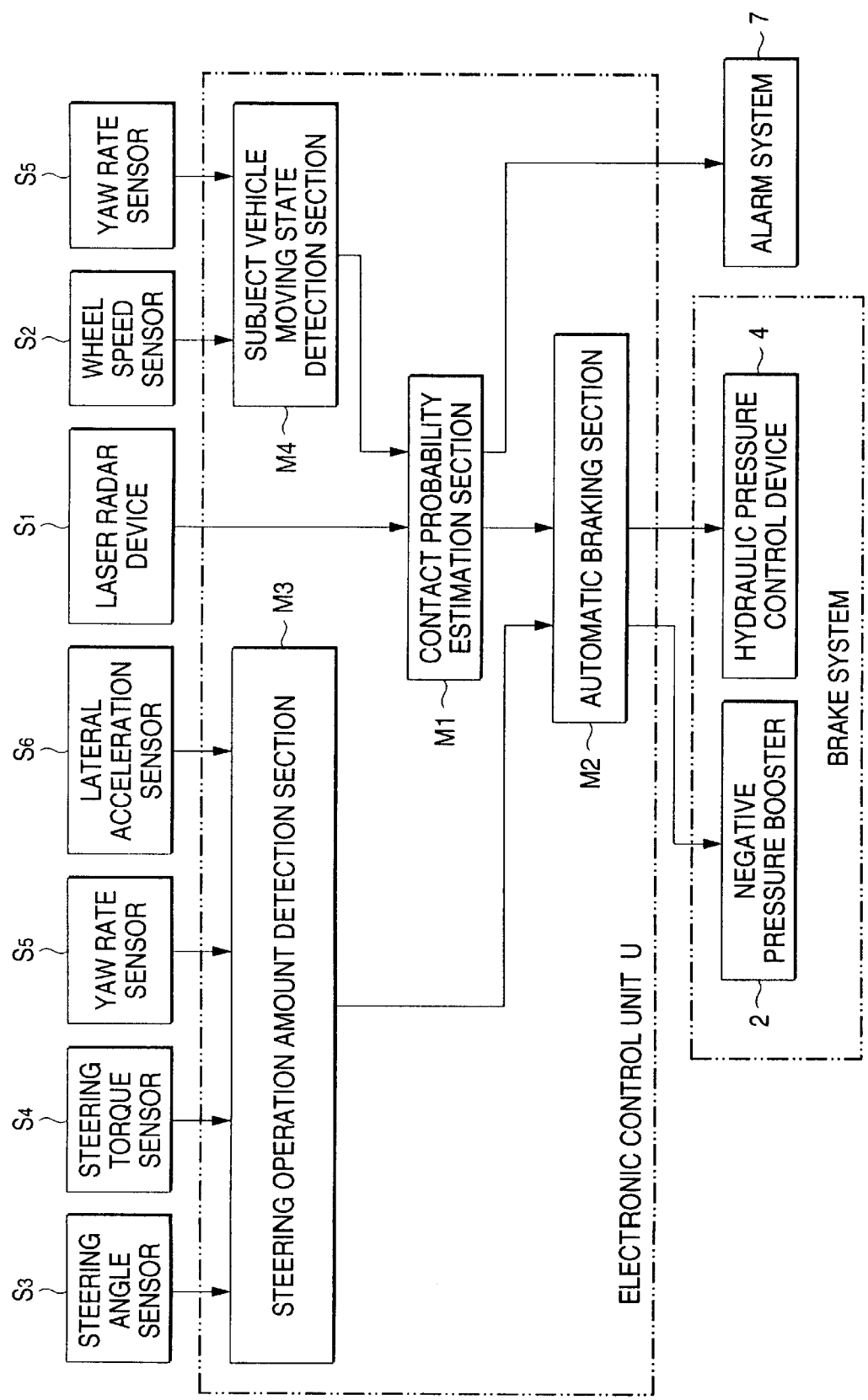
FIG. 3 is a block diagram showing a circuit construction of an electronic control unit.

As shown in FIG. 3, provided in the electronic control unit U are a contact probability estimation section M1, an automatic braking section M2, a steering operation amount detection section M3 and a subject vehicle moving state detection section M4.

The contact probability estimation section M1 estimates a degree of probability in which the subject vehicle comes into contact with the object based on a relative distance and a relative speed between the subject vehicle and the object detected by the radar device $S_1$ and a moving state of the subject vehicle detected by the subject vehicle moving state detection section M4. For instance, the contact probability estimation section M1 estimates that there is a high probability that the subject vehicle comes into contact with the object if a relative distance between the subject vehicle and the object falls below a predetermined threshold value or a relative speed at which the subject vehicle approaches the object exceeds a predetermined threshold value. At this time, if the vehicle speed and positive acceleration of the subject vehicle are great, it becomes difficult to avoid a contact by braking or steering operation. In view of this fact, the respective threshold values described above are then corrected depending on the magnitude of the vehicle speed and acceleration of the subject vehicle, thereby making it possible to perform a more accurate estimation. In addition, it is possible to take into consideration, in conjunction with the estimation by the contact probability estimation section, an amount of lateral overlapping of the subject vehicle with the object detected by the radar device $S_1$ and a turning state of the subject vehicle detected by the yaw rate sensor $S_5$.

The steering operation amount detection section M3 detects the steering operation by the driver, as well as an amount of the steering operation based on signals from the steering angle sensor $S_3$, the steering torque sensor $S_4$, the yaw rate sensor $S_5$ and the lateral acceleration sensor $S_6$.

When the contact probability estimation section M1 estimates that there is a probability that the subject vehicle comes into contact with the object, the alarm system 7 is actuated so as to urge the driver to voluntarily apply the brakes via sounds and/or images, while the automatic braking section M2 actuates the electronically controlled negative pressure booster 2 so as to generate a brake hydraulic pressure in the master cylinder 3, so that the brake hydraulic pressure so generated is supplied to the brake calipers $5_{FR}$, $5_{FL}$, $5_{RR}$, $5_{RL}$ via the hydraulic pressure control device 4 for execution of automatic braking.

During the execution of automatic braking, when the steering operation amount detection section M3 detects the voluntary steering operation by the driver, the cancellation gradient (cancellation time or speed) of automatic braking by the automatic braking section M2 is changed in response to a contact probability estimated by the contact probability estimation section M1 or a steering operation amount detected by the steering operation amount detection section M3.

The subject vehicle moving state detection section M4 detects the moving state of the subject vehicle based on a vehicle speed of the subject vehicle detected by the wheel speed sensors $S_2$ . . ., an acceleration of the subject vehicle which is a time differentiated valueof the vehicle speed so detected, and a turning state of the subject vehicle detected by the yaw rate sensor $S_5$. This moving state of the subject vehicle so detected is then inputted into the contact probability estimation section M1 so as to be taken into consideration in estimating a contact probability as described above.

Figure 4:
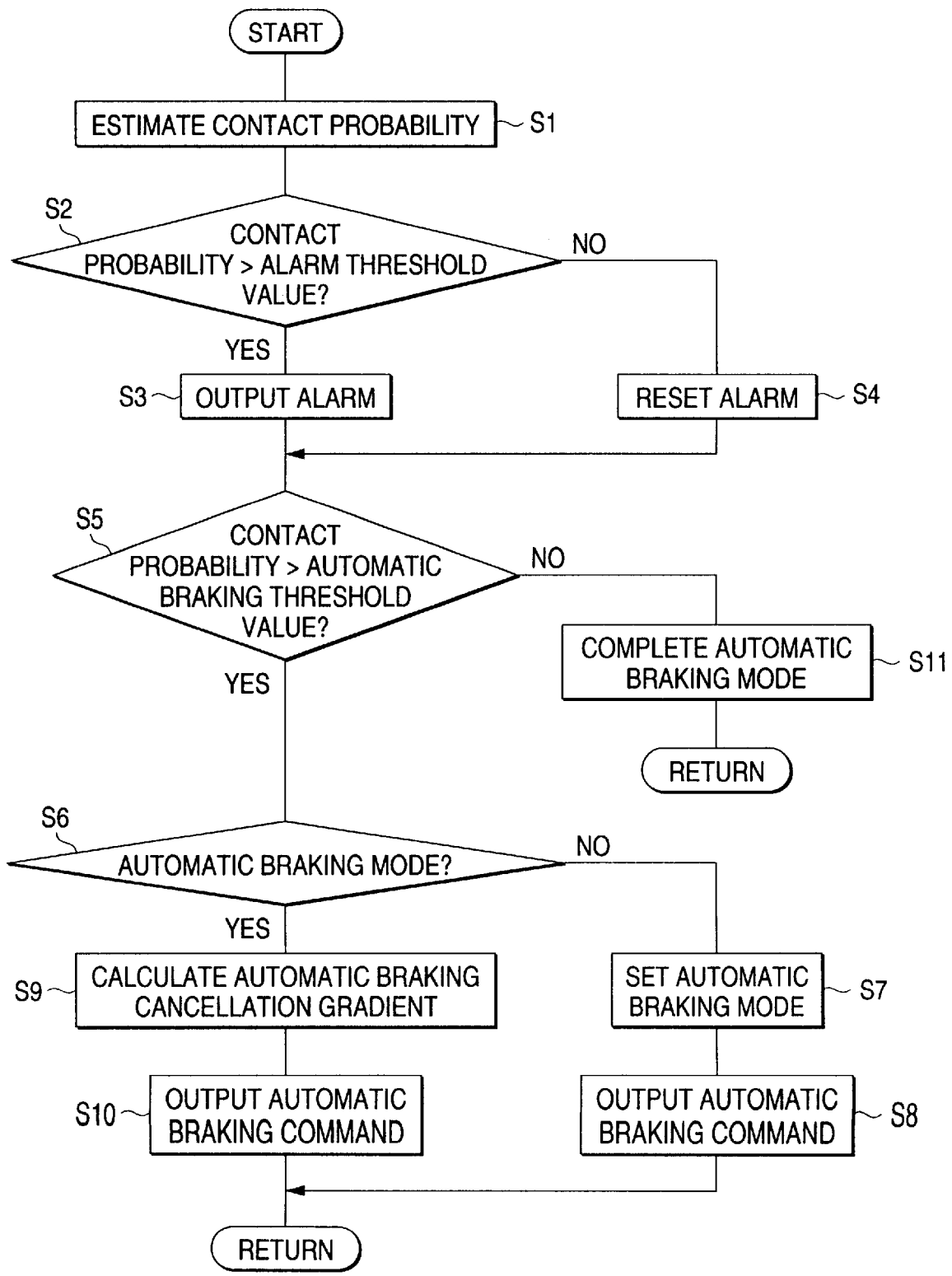
FIG. 4 is a flow chart explaining an operation of the safety running system.

Next, referring to a flow chart in FIG. 4, an operation of the embodiment will be described below.

First of all, at Step S1, a contact probability is estimated by the contact probability estimation section M1 in which the subject vehicle comes into contact with the object. To be specific, a relative distance between the subject vehicle and the object detected by the radar device $S_1$ is divided by a relative speed similarly detected by the radar device $S_1$ to calculate an estimated time taken until a probable contact, and this estimated contact time is applied to a map showing in FIG. 5, whereby a contact probability can be calculated. The contact probability is expressed by numeric values from 0 to 1; "0" corresponds to a state in which the contact probability is minimum, and "1" to a state in which the contact probability is maximum. As is clear from FIG. 5, when it is difficult to avoid a contact due to a short estimated contact time, the contact probability becomes high, and on the contrary, when it is easy to avoid a contact due to a long estimated contact time, the contact probability becomes low.

In calculating an estimated contact time, as is described above, when taking into consideration a vehicle speed of the subject vehicle detected by the subject vehicle moving state detection section M4, an acceleration and a turning state, an estimated contact time can be calculated in a more accurate fashion, and the accuracy in estimation of a contact probability can also be improved in response to the improvement in calculation.

In addition, there is another method of estimating a contact probability. In this method, a lateral travelling amount required to avoid the contact with the object through the steering operation is calculated from a relationship between the position of the object detected by the radar device $S_1$ and the travelling locus of the subject vehicle estimated with the subject vehicle moving state detection section M4, and this calculated lateral travelling amount is then applied to a map shown in FIG. 6 for calculation of a contact probability. As is clear from FIG. 6, when the lateral moving amount required to avoid the contact with the object is small, it is estimated that the contact probability is low, and on the contrary, when the lateral moving amount required to avoid the contact with the object is large, then it is estimated that the contact probability is high.

Figure 5:
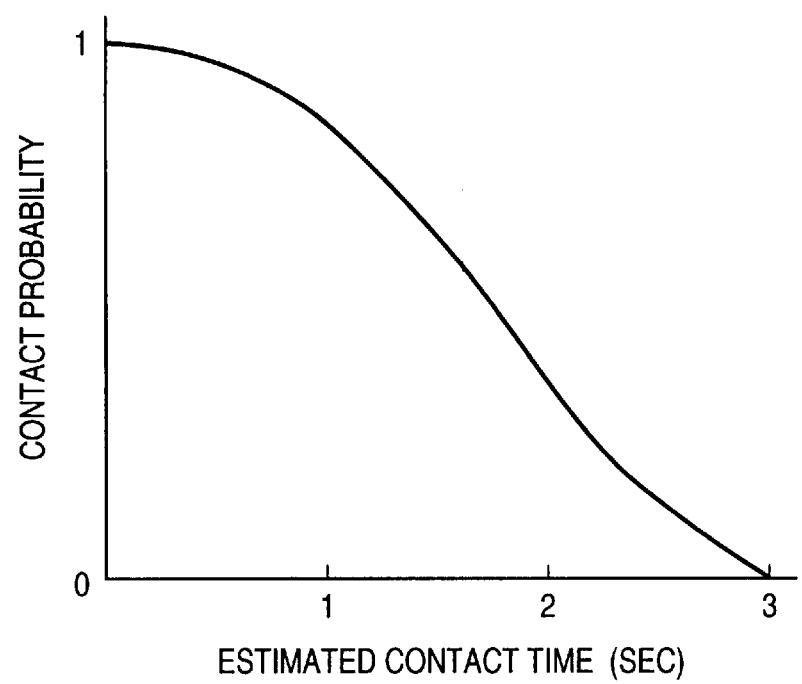
FIG. 5 is a graph showing a map for calculating a contact probability from an estimated contact time.
Figure 6:
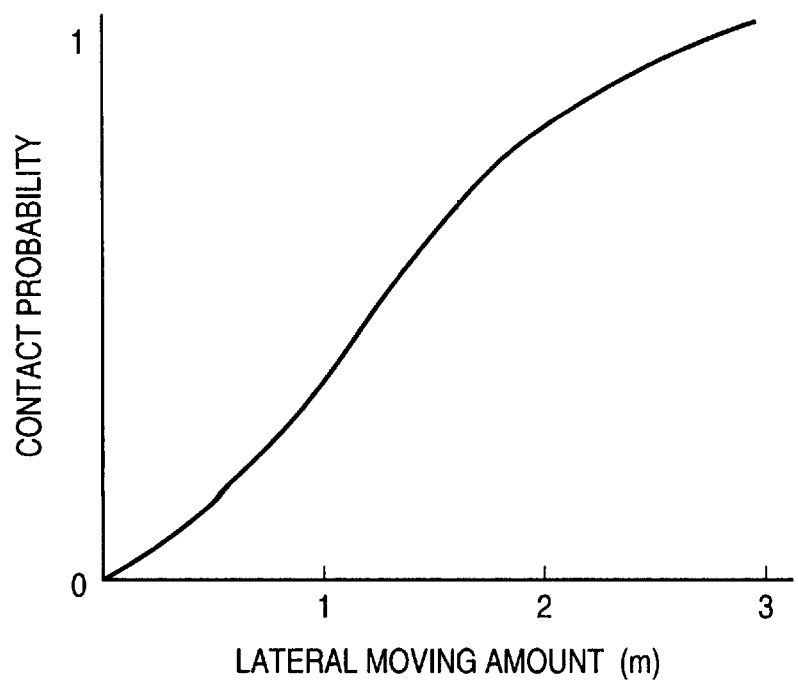
FIG. 6 is a graph showing a map for calculating a contact probability from a lateral travelling amount.

A final contact probability can be calculated by multiplying the contact probability calculated using the map in FIG. 5 by the contact probability calculated using the map in FIG. 6. In addition, a final contact probability can also be calculated directly using a two-dimensional map using the estimated contact time and the lateral moving mount as a parameter.

At the following Step S2, if it is found that the contact probability estimated at Step S1 exceeds an alarm threshold value set in advance, then the alarm system 7 is actuated at Step S3 so as to urge the driver to take a voluntary contact avoidance action. When the contact probability is equal to or less than the alarm threshold value or the contact probability exceeded the alarm threshold value changes to a value equal to or less than the alarm threshold value, then the alarm system 7 is made inoperative at Step S4.

At the following Step S5, if it is found that the contact probability estimated at Step S1 exceeds a preset automatic braking threshold value, then at the following Step S6, whether or not an automatic braking mode has already been set is judged. In other words, if the contact probability exceeds the automatic braking threshold value at Step S5 in the current loop for the first time, since the automatic braking mode has not yet been set at Step S6, then the control moves to step S7 so as to set the automatic braking mode, and at Step S8, an automatic braking command is outputted. As a result of this, even if the driver does not perform a voluntary braking operation, the automatic braking section M2 actuates the electronically controlled negative pressure booster 2, whereby brake hydraulic pressure generated by the master cylinder 3 is transmitted to the brake calipers $5_{FR}$, $5_{FL}$, $5_{RR}$, $5_{RL}$ via the hydraulic pressure control device 4 for execution of automatic braking with a view to avoiding the contact with the object. The deceleration of the vehicle V generated by the aforesaid automatic braking is a moderate one or it ranges substantially from 0.4 G to 0.6 G.

Since the automatic braking mode is already set at Step S6 in the following loop, the control moves to Step S9 for calculation of an automatic braking cancellation gradient. When the driver voluntarily performs the steering operation to avoid the contact with the object while automatic braking is in operation, the automatic braking is cancelled so as to avoid interference thereof with the steering operation by the driver, and the automatic braking cancellation gradient corresponds to a speed at which automatic braking is cancelled.

Figure 7:
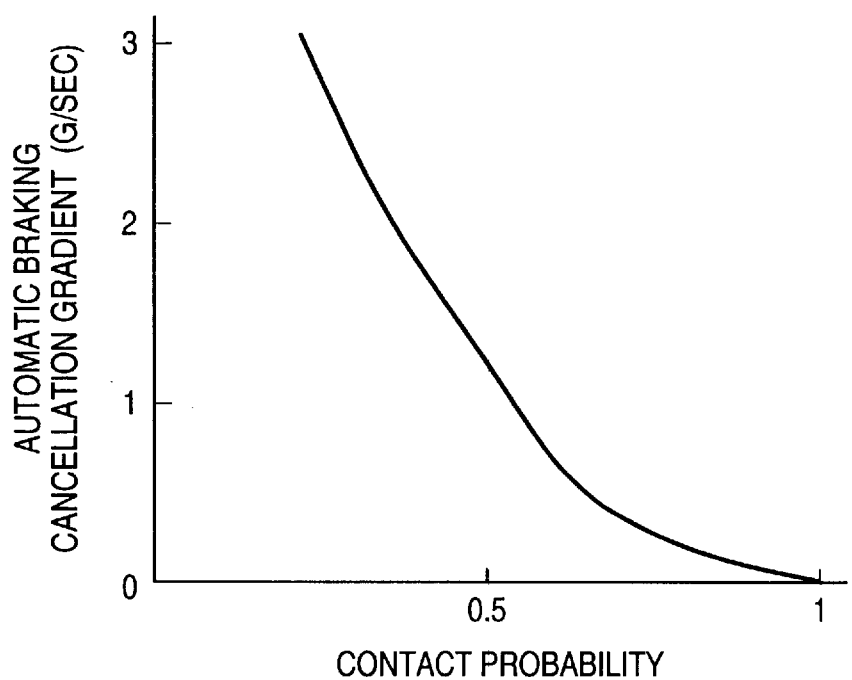
FIG. 7 is a graph showing a map for calculating an automatic braking cancellation gradient from a contact probability.

FIG. 7 shows a map for calculating an automatic braking cancellation gradient based on the contact probability estimated by the contact probability estimation section M1. When the contact probability is low, in other words, when the object can be avoided with a sufficient margin through voluntary steering operation by the driver, the automatic braking cancellation gradient is made large so as to cancel automatic braking quickly, whereby the automatic braking is prevented from interfering with the steering operation by the driver, generation of a feeling of physical disorder being thereby prevented. On the contrary, when the contact probability is high, in other words, when the object is difficult to be avoided through voluntary steering operation by the driver, the automatic braking cancellation gradient is made small so as to cancel the automatic braking moderately, whereby the automatic braking is prevented from interfering with the steering operation by the driver while the deceleration effect by the automatic braking is allowed to be exhibited to a maximum level.

Figure 8:
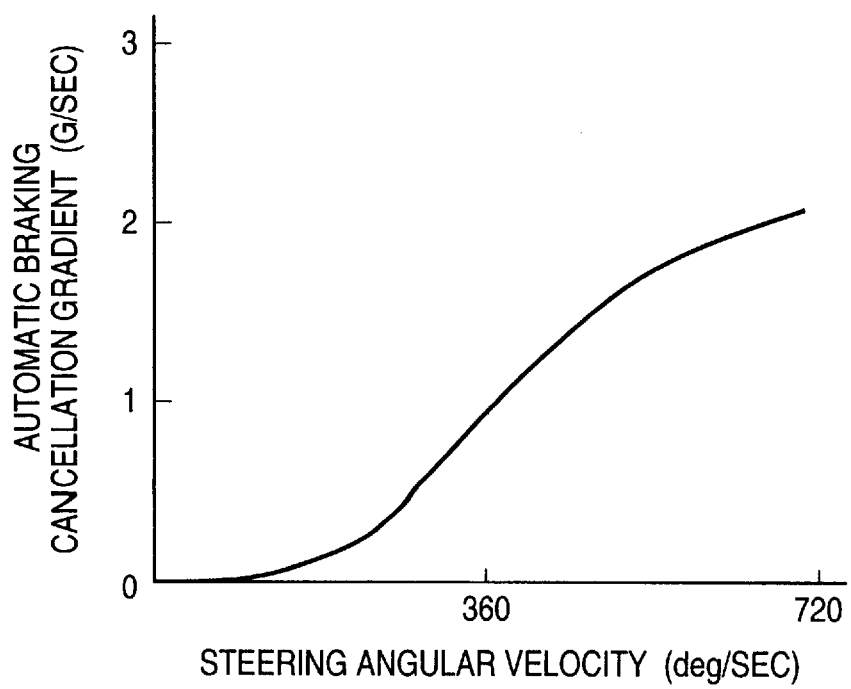
FIG. 8 is a graph showing a map for calculating an automatic braking cancellation gradient from a steering angular velocity.

FIG. 8 shows another map for calculating an automatic braking cancellation gradient based on a steering angular velocity detected by the steering operation amount detection section M3. This map calculates a maximum value for the steering angular velocity of the steering wheel 10 as a steering operation amount, in other words, the map calculates a steering angular velocity as a time differentiated value of a steering angle detected by the steering angle sensor $S_3$ so as to set a maximum value for the steering angular velocity within a predetermined time period as a parameter. When the steering angular velocity is large, it means that there is a high probability in which the contact with the object can be avoided through the steering operation, and in this case, the automatic braking cancellation gradient is made large so as to cancel the automatic braking quickly, whereby the automatic braking is prevented from interfering with the steering operation, generation of a feeling of physical disorder being thereby prevented. In contrast, when the steering angular velocity is small, it means that there is a low probability in which the contact with the object can be avoided through steering of the steering wheel, and in this case, the automatic braking cancellation gradient is made small so as to cancel automatic braking moderately, whereby the automatic braking is prevented from interfering with the steering operation by the driver while the deceleration effect by the automatic braking is allowed to be exhibited to a maximum level.

In the map shown in FIG. 8, the steering angular velocity which is the steering operation amount is adopted as a parameter, but it is possible to adopt as a parameter other steering operation amounts such as expressed by a steering torque detected with the steering torque sensor $S_4$, a yaw rate detected with the yaw rate sensor $S_5$, a lateral acceleration detected with the lateral acceleration sensor $S_6$, or time differential values thereof.

A final automatic braking cancellation gradient can be calculated as a function of the automatic braking cancellation gradient calculated using the map shown in FIG. 7 and the automatic braking cancellation gradient calculated using the map shown in FIG. 8. In addition, the final automatic braking cancellation gradient can be directly calculated using a two-dimensional map using as a parameter the contact probability and the steering angular velocity.

Thus, as is described above, when the automatic braking cancellation gradient is calculated at the aforesaid Step S9, at Step S10, the automatic braking section M2 reduces the braking force of the automatic braking in response to the automatic braking cancellation gradient so calculated by controlling the operation of the electronically controlled negative pressure booster 2 and the hydraulic pressure control device 4.

If the contact probability becomes equal to or less than the automatic braking threshold value at Step S5, or if the contact probability becomes equal to or less than the automatic braking threshold value while the automatic braking mode is in operation, the automatic braking mode is completed at Step S11.

Figure 9A:
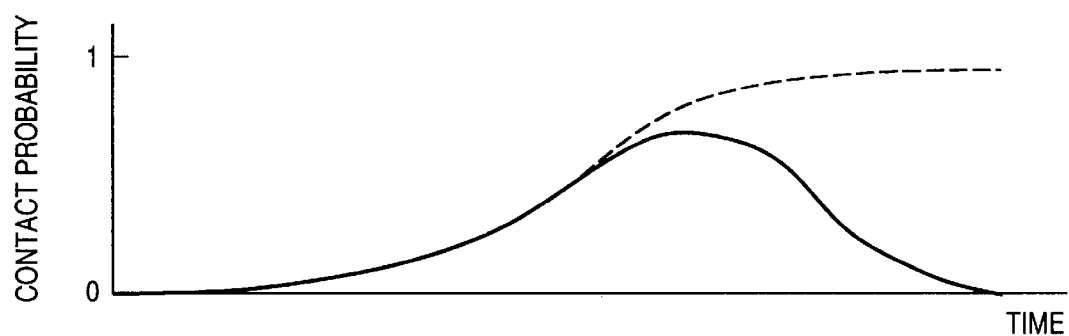
FIGS. 9A to 9C are timing charts explaining an operation of the safety running system.
Figure 9B:
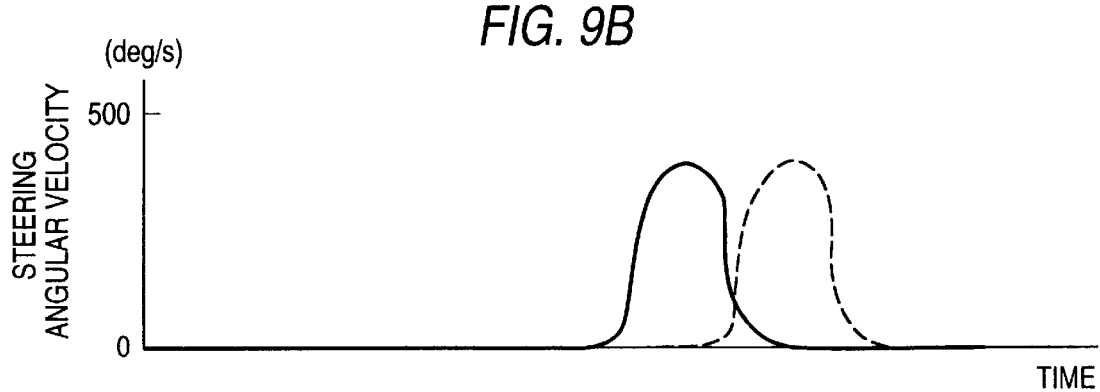
Figure 9C:
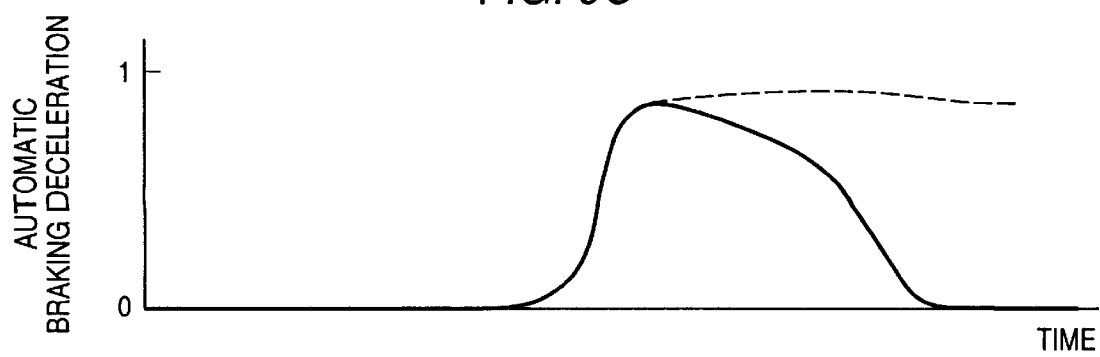

Next, an example of the aforesaid operation will be described based on timing charts shown in FIGS. 9A to 9C.

A solid line denotes a case where the driver performs the steering operation in an early stage in order to avoid the contact with the object. When the contact probability increases over time, if the driver performs the steering operation in an early stage in order to try to avoid the contact with the object, since the contact probability then is relatively low, the automatic braking cancellation gradient becomes a large value (refer to FIG. 7), and this quickly reduces the deceleration of the automatic braking. As a result, this restrains to a minimum level the interference of the automatic braking with the steering operation by the driver. Moreover, since the contact probability is reduced through the steering operation by the driver, the automatic braking cancellation gradient is increased, whereby the deceleration of the automatic braking is further reduced.

A broken line denotes a case where the steering operation by the driver for avoidance of the contact is delayed. If the driver delays the steering operation for avoidance of the contact, since the contact probability then becomes high, the automatic braking cancellation gradient becomes a small value (refer to FIG. 7) and this moderately reduces the deceleration of the automatic braking. As a result of this, even in a case where a delayed steering operation by the driver makes it difficult to avoid a contact, a sufficient braking force under automatic braking can be secured to thereby restrain a damage due to the contact to a minimum level.

While the embodiment of the present invention has been described heretofore, it should be understood that the present invention may be modified in design in any ways without departing from the spirit and scope of the present invention.

For instance, it is possible to adopt as a final contact probability either of the contact probability calculated using the map in FIG. 5 and the contact probability calculated using the map in FIG. 6. Similarly, it is possible to adopt as a final automatic braking cancellation gradient either of the automatic braking cancellation gradient calculated using the map in FIG. 7 and the automatic braking cancellation gradient calculated using the map in FIG. 8.

According to the invention, while the automatic braking section performs automatic braking in order to avoid a probable contact of the subject vehicle with the object that is estimated by the contact probability estimation section, when the driver voluntarily performs the steering operation in order to try to avoid the estimated contact, since the automatic braking section cancels automatic braking for a time period or at a speed determined based on at least either of the contact probability estimated by the contact probability estimation section and the steering operation amount detected by the steering operation amount detection section, it is possible to avoid the interference of the steering operation by the driver with the automatic braking, while securing a maximum effectiveness of the automatic braking in avoiding the contact by canceling the automatic braking quickly or moderately depending on states.

What is claimed is:

1. A vehicle safety running system comprising:
    object detection means for detecting an object in front of a subject vehicle in a direction in which the subject vehicle travels;
    contact probability estimation means for estimating probability in which the subject vehicle comes into contact with the detected object;
    automatic braking means for automatically actuating a brake system of the subject vehicle when said contact probability estimation means estimates that there is a probability of such contact; and
    steering operation amount detection means for detecting a steering operation amount based on a steering operation by a driver,
    wherein when said steering operation amount detection means detects that the driver performs the steering operation while said automatic braking means is in operation, said automatic braking means cancels automatic braking for a time period or at a speed determined based on at least one of the contact probability estimated by said contact probability estimation means and the steering operation amount detected by said steering operation amount detection means.

2. The vehicle safety running system as set forth in claim 1, wherein said automatic braking means extends a cancellation time longer for which automatic braking is kept cancelled or slows down a cancellation speed lower at which automatic braking is cancelled as said contact probability estimation means estimates a higher probability of contact.

3. The vehicle safety running system as set forth in claim 1, further comprising subject vehicle moving state detection means for detecting a moving state of the subject vehicle, wherein said contact probability estimation means estimates a time taken until the subject vehicle comes into contact with the object based on the moving state of the subject vehicle detected by said subject vehicle moving state detection means and the results of a detection carried out by said object detection means, whereby it is estimated that there is a higher probability of contact as the estimated contact time becomes shorter.

4. The vehicle safety running system as set forth in claim 1, further comprising subject vehicle moving state detection means for detecting a moving state of the subject vehicle, wherein said contact probability estimation means estimates a lateral travelling amount required to avoid a contact of the subject vehicle with the object based on the moving state of the subject vehicle detected by said subject vehicle moving state detection means and the results of a detection carried out by said object detection means, whereby it is estimated that there is a higher probability of contact as the lateral travelling amount so estimated becomes greater.

5. The vehicle safety running system as set forth in claim 1, wherein said automatic braking means reduces a cancellation time shorter for which automatic braking is kept cancelled or increases a cancellation speed higher at which automatic braking is cancelled as said steering operation amount detection means detects a greater steering operation amount.

6. The vehicle safety running system as set forth in claim 5, wherein the steering operation amount is obtained based on at least any of the amount of steering angle, steering torque, lateral moving amount of the subject vehicle and variations thereof over time.

7. The vehicle safety running system as set forth in claim 6, wherein the lateral moving amount of the subject vehicle is obtained based on at least either the lateral acceleration of the subject vehicle or the yaw rate thereof.

* * * * *